2,863,799

REPELLENTS FOR STABLE FLIES

Lyle D. Goodhue, Bartlesville, and Kenneth E. Cantrel, Dewey, Okla., assignors to Phillips Petroleum Company, a corporation of Delaware No Drawing. Application July 28, 1955
Serial No. 525,077

17 Claims. (Cl. 167—22)

This invention relates to repellents for stable flies. In one aspect this invention relates to certain alkylene oxide-mercaptan mono-condensation products as stable fly repellents. In another aspect this invention relates to a method for employing said condensation products as stable fly repellents.

The control of stable flies is a particularly important problem on farms and ranches. The stable fly, *Stomoxys calcitrans* (Linn.), is a bad pest of domestic animals, particularly cattle, horses, etc. Stable flies have long, piercing mouth parts which they use to penetrate the skin of the animal and thus feed on the animal. They annoy the animals continuously, and weaken them by loss of blood. The resulting economic loss due to stable flies is especially noticeable in the case of dairy cows, as milk production diminishes markedly when the cows are bothered by large numbers of stable flies. An effective stable fly repellent would be of great benefit to the farmer as it would both increase the production of milk and beef and improve the general state of health of his animals.

We have discovered that certain mono-condensation products of alkylene oxides with mercaptans are effective stable fly repellents. The mono-condensation products of our invention are characterized by the following structural formula

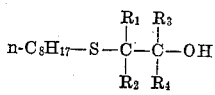

In the above formula, $R_1$, $R_2$, $R_3$, and $R_4$ can be hydrogen, a methyl radical, an ethyl radical, a propyl or isopropyl radical, or a normal, iso- or tert-butyl radical in any combination such that the total number of carbon atoms in $R_1$, $R_2$, $R_3$, $R_4$ does not exceed four.

Examples of compounds characterized by the above structural formula which are applicable as stable fly repellents by the method of our invention are: 2-hydroxyethyl n-octyl sulfide, 2-methyl-2-hydroxypropyl n-octyl sulfide, 2(3-hydroxybutyl) n-octyl sulfide, 3(4-hydroxyhexyl) n-octyl sulfide, 2(3-hydroxy-4-methylpentyl) n-octyl sulfide, 2(1-hydroxyhexyl) n-octyl sulfide, 2-hydroxy-3,3-dimethylbutyl n-octyl sulfide, 2-hydroxybutyl n-octyl sulfide, 2-hydroxy-3-methylbutyl n-octyl sulfide and 2-hydroxypropyl n-octyl sulfide.

Not all mono-condensation products of an alkylene oxide with a mercaptan are effective stable fly repellents. In fact, we have found that the mono-condensation product of an alkylene oxide with n-octyl mercaptan is an effective stable fly repellent whereas the mono-condensation product of the same alkylene oxide with tert-octyl mercaptan is not an effective stable fly repellent. For example: we have found that 2-hydroxyethyl n-octyl sulfide is an effective stable fly repellent but 2-hydroxyethyl tert-octyl sulfide has practically no repellent action towards stable flies. This distinction between the normal octyl sulfide and the tert-octyl sulfide is to be particularly noted. Comparative data illustrating this distinction and comparing other alkylene oxide mercaptan mono-condensation products are given below in Table I.

In some instances, our repellent material can be advantageously applied without a carrier or solvent of any kind. However, it is usually preferred to employ a repellent adjuvant as a carrier for our repellent material to aid in the application or presentation of said materials. By the term repellent adjuvant, we mean a substance which is capable of presenting or aiding in the presentation of a repellent material so that its repellent action will be realized. The term adjuvant is well established in the art where it is recognized that an active agent or repellent is frequently, in itself, of little practical utility unless it be presented in a form suitable for subjecting the insect to be repelled to the action of the agent or its vapors, as the particular case may require. Thus, additional material or materials are frequently employed in the formulation of an active agent to yield a suitable agent or repellent composition, such materials being adjuvants.

Our repellent materials are effective for repelling stable flies from surfaces frequented by them when applied to said surfaces in suitable form, such as a solution, powder, emulsion, aerosol, cream, fog, lotion, or the like. By way of example, we have found that it is convenient to dissolve our repellent material in a solvent, or otherwise employ them in a suitable carrier, and apply the composition so formed to a surface or at a place from which the stable flies are to be repelled. When our repellent materials are applied to either the surface of the animal and/or to the nearby surface areas such as the walls and stalls of barns, they serve to repel the stable fly for a considerable period of time. Generally, our new stable fly repellents give the greatest protection to an animal when applied directly to the animal itself.

Solvents or carriers which are applicable to the invention include those which have no detrimental effect upon the repellent activity of our repellents and which, when the repellent composition is applied to livestock, is substantially non-irritating and non-toxic to the animal. Examples of suitable carrier materials are: petrolatum, acetone, kerosene (deodorized kerosene is preferred), and high-boiling isoparaffinic hydrocarbons such as are prepared by the alkylation of paraffins with olefins using hydrofluoric acid or sulfuric acid as a catalyst. Solid inert carrier materials such as talc, kieselguhr, and other inert carrier can be used in preparing dusts. The repellent materials of our invention can also be applied in the form of an aqueous emulsion, and wetting agents such as an alkylated aryl polyether alcohol or the like can be employed as an emulsifying agent if desired.

When employing our repellent materials in a solvent or carrier, the concentration of the repellent material is governed by the method of application and adjusted so as to apply a predetermined amount of the repellent material per unit of surface or area to be protected.

Our repellents are effective repellents for stable flies when applied in a manner so as to deposit from one to 50 grams of the active ingredient per 100 sq. ft. of surface. Larger or smaller amounts can be applied if desired, although the period during which the surface is repellent will be shortened if smaller amounts than one gram per 100 sq. ft. are employed.

Our repellent materials can be effectively employed in admixture with other stable fly repellents when so desired. Further, if it is so desired, our stable fly repellents can be employed in admixture with repellents for the common house fly so as to produce a composition which is repellent to both stable flies and house flies.

The repellent materials of our invention can be prepared by methods well known in the art. The following preparations illustrate one method of preparing our repellent materials:

PREPARATION OF 2-HYDROXYPROPYL N-OCTYL SULFIDE

To a 3-necked flask (500 ml.) equipped with a stirrer and a Dry Ice-acetone cooled reflux condenser were charged 71 grams of n-octyl mercaptan and 2 ml. of 20% by weight solution of sodium hydroxide in methyl alcohol. The sodium hydroxide solution was added to serve as a catalyst. The mixture in the flask was then heated to about 220° F., after which 29 grams of propylene oxide was added dropwise to the mixture. The reaction which resulted was quite vigorous. After the reaction was complete, the contents of the flask were neutralized with concentrated hydrochloric acid (38%) until a phenolphthalein end point was reached. The crude product which was recovered amounted to 101.1 grams. This crude product was distilled to yield 83.6 grams of a pure product which boiled at 102–103° C. at 0.2 mm. of mercury absolute pressure.

PREPARATION OF 2-HYDROXYETHYL N-OCTYL SULFIDE

The following materials were reacted in a 3-necked flask by the same procedure as was used in the preceding preparation.

n-Octyl mercaptan _____ grams __ 269
Ethylene oxide _____ do ____ 85
20% by weight solution of NaOH in MeOH (catalyst) _____ cc __ 6

The purified product which resulted from the reaction amounted to 288.2 grams and had a boiling point of 98° C. at 0.1 mm. of mercury absolute pressure. The refractive index of this product was found to be 1.4750 ($n_D 20°$).

Suitable alkylene oxides which can be reacted with n-octyl mercaptans to form our mono-condensation product repellent materials other than ethylene oxide and propylene oxide, include for example, 2-methyl-1,2-epoxypropane, 2,3-epoxybutane, 3-methyl-1,2-epoxybutane, 2-methyl-2,3-epoxybutane, 2,3-epoxyhexane, and 3,3-dimethyl-1,2-epoxybutane. Methods for the preparation of alkylene oxides are given in Beilstein XVII, pp. 4–15.

The condensation reaction can probably be represented by the following general equation:

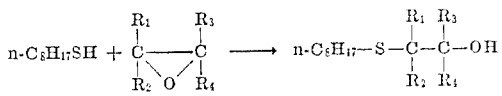

where $R_1$, $R_2$, $R_3$, and $R_4$ are as previously defined.

The following examples further illustrate our invention:

Example I

Organdy bags, fabricated from organdy sheets 10 inches square, were impregnated with 1 gram of the candidate repellent dissolved in 6 to 7 ml. of acetone and were then suspended on a line to dry. After 24 hours, the bags were drawn over the hand and exposed to several thousand hungry stable flies confined in 30-inch cubical cages. The time to the first bite was recorded. If no bites were received in 5 minutes, the bag was withdrawn and inserted again on the following day. If, in the first five-minute exposure, bites were obtained, three successive five-minute exposures were made as described. If, however, no bites were obtained, further repetition was not made until the following day. The bags were suspended open to aeration between trials on successive days. Generally, the flies bite in less than a minute if they bite at all. If a bite was received, the number of seconds were counted to the first, second and third bites. The results of these tests are given below in Table I.

TABLE I

| Compound | Seconds to 1st—2nd—3rd Bites Days Aged | | | | | | | |
|---|---|---|---|---|---|---|---|---|
| | 1 Day | 2 Days | 3 Days | 4 Days | 5 Days | 6 Days | 7 Days | 8 Days |
| 2-hydroxyethyl n-octyl sulfide | [1] NB | NB | NB | NB | NB | NB | NB | 15, 16, 17 |
| 2-hydroxyethyl tert-octyl sulfide | 35, 10, 13 | | | | | | | |
| 2-hydroxyethyl tert-nonyl sulfide | 15, 20, 4 | | | | | | | |
| 2-hydroxyethyl n-decyl sulfide | 15, 25, 26 | | | | | | | |
| 2-hydroxyethyl tert-dodecyl sulfide | 6, 6, 3 | | | | | | | |
| 2-hydroxyethyl n-dodecyl sulfide | 5, 5, 5 | | | | | | | |
| 2-hydroxyethyl tert-tetradecyl sulfide | 8, 4, 5 | | | | | | | |
| 2-hydroxyethyl phenylethyl sulfide | 60, 80, 23 | | | | | | | |

[1] No bites.

Example II

The above tests with 2-hydroxyethyl n-octyl sulfide were repeated, using a different colony of stable flies, in the same manner as in Example I except that the organdy bag was impregnated with two grams of the repellent material. In addition, tests were made in the same manner as in Example I employing 2-hydroxypropyl n-octyl sulfide. The results of these tests are given below in Table II.

TABLE II

| Repellent | Grams of Repellent in Dipping Soln. | Days No. of Bites Sustained | | | | | | | | |
|---|---|---|---|---|---|---|---|---|---|---|
| | | 1 Day | 2 Days | 3 Days | 4 Days | 5 Days | 6 Days | 7 Days | 8 Days | 9 Days |
| 2-hydroxyethyl-n-octyl sulfide | 2 | [1] NB | NB | NB | NB | NB | NB | NB | 10-5 NB | 50-85-32 |
| 2-hydroxypropyl-n-octyl sulfide | 1 | NB | NB | NB | NB | NB | NB | 35-100-165 | | |

[1] No bites.

From the above data it is clearly evident that of the numerous alkylene oxide mercaptan mono-condensation products tested only the condensation product of the n-octyl mercaptan is an effective stable fly repellent. It is indeed surprising to find that the tert-octyl mercaptan condensation product is not an effective stable fly repellent.

While it is intended that our repellent materials are to be used primarily to protect livestock, toxicity tests indicate that said materials can be used to protect other animals, including humans, when applied in suitable and proper amounts.

Reasonable variation and modification of the herein-described invention are possible without departing from the scope thereof or from the claims.

We claim:

1. A method of repelling stable flies from a place frequented by said flies which comprises applying at said place, in an amount sufficient to effectively repel said flies, a mono-condensation product of an alkylene oxide and a mercaptan, said product being characterized by the following structural formula

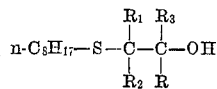

wherein: $R_1$, $R_2$, $R_3$ and $R_4$ are selected from the group consisting of hydrogen, methyl, ethyl, propyl, isopropyl, n-butyl, isobutyl, and tert-butyl radicals; and the total number of carbon atoms in $R_1$, $R_2$, $R_3$, and $R_4$ does not exceed four.

2. The method of claim 1 wherein said mono-condensation product is 2-hydroxyethyl-n-octyl sulfide.

3. The method of claim 1 wherein said mono-condensation product is 2-hydroxypropyl n-octyl sulfide.

4. The method of claim 1 wherein said mono-condensation product is 2-methyl-2-hydroxypropyl n-octyl sulfide.

5. The method of claim 1 wherein said mono-condensation product is 2-hydroxybutyl n-octyl sulfide.

6. The method of claim 1 wherein said mono-condensation product is 2-hydroxy-3-methylbutyl n-octyl sulfide.

7. A composition suitable for repelling stable flies from a place frequented by said flies containing as an essential active ingredient thereof a mono-condensation product of an alkylene oxide with a mercaptan, in an amount sufficient to effectively repel said flies, and a repellent adjuvant as a carrier therefor, present in an amount sufficient to permit said condensation product to act in a desirable manner as a repellent for said flies; said condensation product being characterized by the structural formula

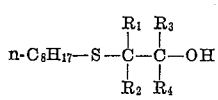

wherein: $R_1$, $R_2$, $R_3$ and $R_4$ are selected from the group consisting of hydrogen, methyl, ethyl, propyl, isopropyl, n-butyl, isobutyl, and tert-butyl radicals; and the total number of carbon atoms in $R_1$, $R_2$, $R_3$, and $R_4$ does not exceed four.

8. A composition according to claim 7 wherein said mono-condensation product is 2-hydroxypropyl n-octyl sulfide.

9. A composition according to claim 7 wherein said mono-condensation product is 2-methyl-2-hydroxypropyl n-octyl sulfide.

10. A composition according to claim 7 wherein said mono-condensation product is 2-hydroxybutyl n-octyl sulfide.

11. A composition according to claim 7 wherein said mono-condensation product is 2-hydroxy-3-methylbutyl n-octyl sulfide.

12. A composition according to claim 7 wherein said mono-condensation product is 2-hydroxyethyl-n-octyl sulfide.

13. A repellent composition according to claim 12 wherein said adjuvant is acetone.

14. A repellent composition according to claim 12 wherein said adjuvant is kerosene.

15. A repellent composition according to claim 12 wherein said adjuvant is isoparaffinic hydrocarbon fractions.

16. A repellent composition according to claim 12 wherein said adjuvant is aqueous emulsion.

17. A repellent composition according to claim 12 wherein said adjuvant is talc.

References Cited in the file of this patent

UNITED STATES PATENTS

| 2,043,941 | Williams | June 9, 1936 |
| 2,052,268 | Williams | Aug. 25, 1936 |
| 2,560,421 | Eby | July 10, 1951 |
| 2,570,051 | Eby | Oct. 2, 1951 |

OTHER REFERENCES

Frear: Chem. of Insecticides, Fungicides and Herbicides, 2nd ed., D. Van Nostrand, 1948, pp. 277–291.

UNITED STATES PATENT OFFICE

Certificate of Correction

Patent No. 2,863,799                                                          December 9, 1958

Lyle D. Goodhue et al.

It is hereby certified that error appears in the printed specification of the above numbered patent requiring correction and that the said Letters Patent should read as corrected below.

Column 5, lines 23 to 26, claim 1, the formula should appear as shown below instead of as in the patent:

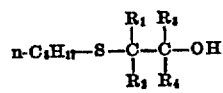

Signed and sealed this 4th day of August 1959.

[SEAL]

Attest:
KARL H. AXLINE,
*Attesting Officer.*

ROBERT C. WATSON,
*Commissioner of Patents.*